UNITED STATES PATENT OFFICE.

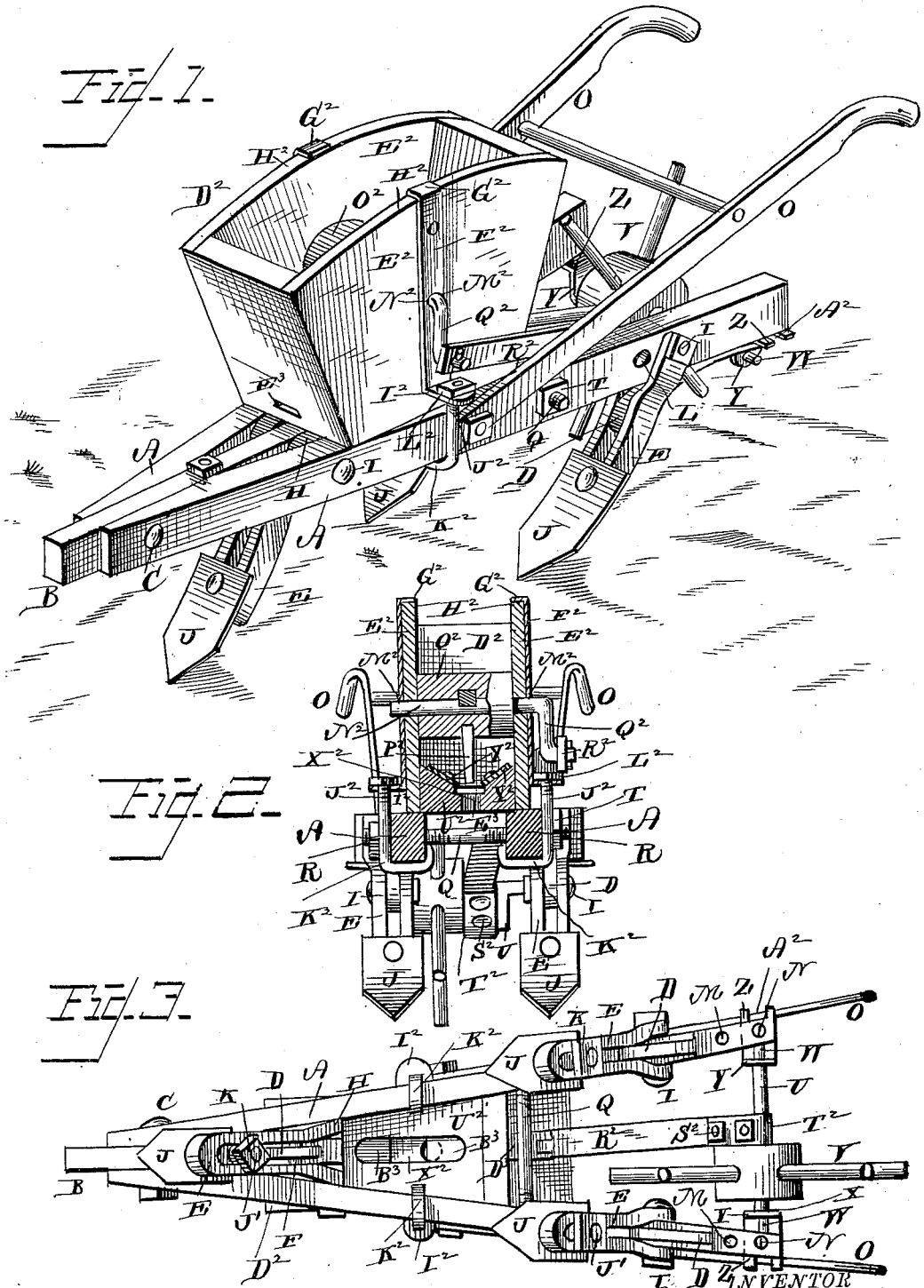

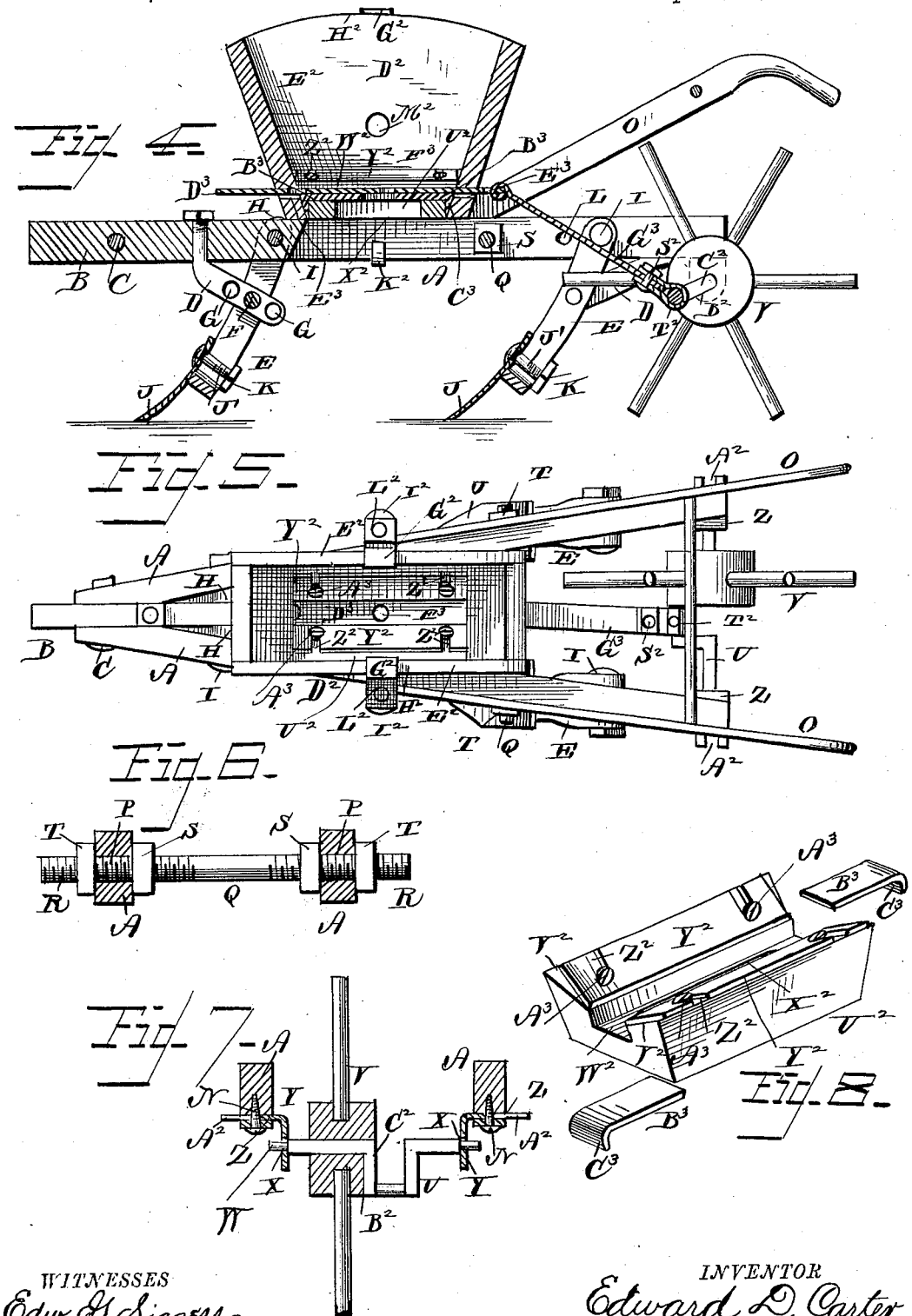

EDWARD D. CARTER, OF WEIMAR, TEXAS.

COMBINED COTTON AND CORN PLANTER AND CULTIVATOR.

SPECIFICATION forming part of Letters Patent No. 284,609, dated September 11, 1883.

Application filed April 11, 1883. (No model.)

*To all whom it may concern:*

Be it known that I, EDWARD D. CARTER, a citizen of the United States, residing at Weimar, in the county of Colorado and State of Texas, have invented a new and useful Combined Cotton and Corn Planter and Cultivator, of which the following is a specification, reference being had to the accompanying drawings.

This invention relates to combined cotton and corn planters and cultivators, and has for its object to provide a simple and inexpensive machine possessing superior advantages in point of general efficiency and convenience in the adjustment of its parts when it is desired to convert from one class into another.

In the drawings, Figure 1 is a perspective view of my improved machine with its parts arranged in position to serve as a cotton-planter. Fig. 2 is a transverse sectional view of the machine in the same position. Fig. 3 is a bottom view of the machine with its parts adjusted for corn-planting. Fig. 4 is a vertical longitudinal sectional view of the same. Fig. 5 is a top view of the machine when in use as a corn-planter. Fig. 6 is a detail transverse sectional view taken through the bolt on which the frame is expanded or contracted. Fig. 7 is a detail transverse sectional view taken through the shaft of the sprocket-wheel. Fig. 8 is a detail view, in perspective, of the bottom of the hopper.

Referring to the drawings, A A designate two divergent longitudinal beams, between the front ends of which is secured an intermediate beam, B, by means of a cross-bolt, C, the said beam B being arranged to project a short distance in between the beams A A. From the under side of the beam B depends a brace rod or bar, D, that is received between the sides of an approximately U-shaped standard, E, and is retained in place by a cross-pin, F, that passes through any one of a series of perforations, G, in the end of the said brace D. The ends H H of the standard E embrace the inner end of the beam B, and are secured in place by a cross-bolt, I, as shown. The cultivator-blade J is provided with a screw-threaded shank, J', which works in between the side of the U-shaped standard, and is secured by a nut, K. This improved form of standard is very strong and can be easily adjusted or removed. At the rear ends of the main beams A A are arranged corresponding standards that embrace the beams, and are adjustable on the latter by having their cross-bolt I adapted to be inserted through any one of a series of perforations, L, in the beams. In these rear standards the brace-rod D is permanently pivoted between the sides of the U-shaped beams, and has a series of perforations, M, in its free end, through any one of which is passed a securing pin or bolt, N, whereby these rear standards can be adjusted or removed in like manner to the front central standard. The handles O O are secured to the beams A A in any suitable manner. At a point somewhat near their rear ends the said beams A A are provided with perforations, P, through which passes a transverse bolt, Q, having screw-threaded ends R R, on which work nuts S S and T T, respectively, against the inner and outer sides of the beams A A. By adjusting these nuts, the beams can be brought together or separated, as desired, and the nuts retain the beams in the position to which they are adjusted.

The machine, with the mechanism above described, will serve as a cultivator, and, when it is desired for use as a planter, a crank-shaft, U, carrying an operating sprocket-wheel, V, is arranged on the beams A A at their rear ends. It is desirable to have this shaft removable, and to this end the spindles W W, at its ends, have their bearings X X in the downwardly-extending portion Y of angular plates Z, that have a slot, $A^2$, in their main portion, by means of which slot they can be adjusted on the pin or bolt N, by which it is secured in position. Thus as the beams A A are separated the bearing-plates Z can be correspondingly arranged. The sprocket-wheel is fixed on the crank-shaft by being provided with a groove, $B^2$, in the end of its hub, in which one side, $C^2$, of the crank of the shaft is received, so that the sprocket-wheel cannot turn on the shaft.

$D^2$ is the removable hopper, which comprises the sides $E^2 E^2$, and has an open top and bottom. The hopper is arranged to rest on the beams A A, and is removably secured in position by means of plates or strips $F^2$, that are secured at each side the hopper, and are provided with inturned flanges $G^2$ at the top, which rest on the top edges, $H^2$, of the sides $E^2$, and relieve the fastenings of the plates $F^2$ from strain. At their bottoms these plates $F^2$ are provided with outwardly-projecting horizontal flanges $I^2$, through which passes the screw-threaded shank $J^2$ of a hook-shaped bolt, $K^2$, that passes under the beam and is secured by a nut, $L^2$, working on its screw-threaded end. Through the plates $F^2$ are formed bearings $M^2$ for the rock-shaft $N^2$, which is removably journaled in the said bearings, and carries a hub, $O^2$, having stirring-teeth $P^2$. The said shaft $N^2$ is formed with a crank, $Q^2$, to which is connected the end of an operating-pitman, $R^2$, that extends rearwardly and is connected by a pin or bolt, $S^2$, to a collar, $T^2$, on the crank of the sprocket-wheel shaft. The bottom of the hopper is formed by a block, $U^2$, that is arranged to be placed in the hopper and be supported on the beams A A. The top surface of this block is beveled, as shown at $V^2 V^2$, on each side toward a longitudinal groove, $W^2$, through the bottom of which extends a longitudinally-disposed slot, $X^2$, through which the cotton is forced by the arms or teeth $P^2$. On the inclines $V^2 V^2$ are arranged plates $Y^2 Y^2$, having slots $Z^2$, by which they can be adjusted on pins $A^3 A^3$ toward the center of the bottom block, to decrease the width of the groove therein.

When the machine is desired for use as a corn-planter, plates $B^3 B^3$ are placed at the ends of the groove $W^2$, to reduce the opening caused by the same, and these plates are provided with end flanges, $C^3$, by which they are retained in position when the bottom block is placed in the hopper. The rock-shaft $N^2$ and its pitman are removed, and in lieu thereof a seed-slide is connected to the collar on the crank of the sprocket-wheel shaft, which seed-slide $D^3$ passes through slots $E^3 E^3$ in the sides of the hopper, and works in the groove $W^2$. The slide comprises a main portion having the seed-perforations $F^3$, and a connecting portion, $G^3$, pivotally connected to the main portion. By adjusting the slides or plates $Y^2$, the quantity of corn dropped can be easily regulated.

I claim as my invention—

1. The combination of the beams A A, the bearing-plates Z Z, right-angular in form and having a slot, $A^2$, in their main portion, the sprocket-wheel crank-shaft having its bearings in these plates, the brace-rods D D, secured to the under side of the beams A A, and the securing-pins N N, passing through the rods D D, and also through the slots $A^2$ in the plates Z, to secure the latter in the position to which they have been adjusted, as set forth.

2. The combination, with the sprocket-wheel shaft having a crank portion, of the sprocket-wheel having its hub provided with a groove, $B^2$, in one end, in which groove one side, $C^2$, of the crank is received, to prevent the sprocket-wheel from turning on the shaft, as set forth.

3. The combination of the beams A A, the hopper $D^2$, the plates or strips $F^2$, secured on each side of the hopper, and provided with inturned flanges $G^2$ at the top, which rest on the top edges of the side of the hopper, and with outturned flanges $I^2$ at the bottom, hook-shaped bolts $K^2$, and nuts $L^2$, as set forth.

4. The combination of the beams A A, the hopper $D^2$, the bottom of the hopper having its top surface beveled, as at $V^2$, toward the center to a longitudinal groove, $W^2$, in the bottom of which is formed a slot, $X^2$, the removable rock-shaft $N^2$, means for operating the latter, the plates $F^2$, secured to the sides of the hopper, and provided with the top flanges, $G^2$, resting on the top edge of the hopper, and the bottom flanges, $I^2$, the bearings $M^2$, formed in the plates $F^2$ for the rock-shaft, the bolts $K^2$, and nuts $L^2$, as set forth.

5. The combination, with the hopper arranged to be supported on the beams of the frame, of the removable bottom block having its top surface beveled toward a central longitudinal groove, in the bottom of which is formed a slot, the plates $Y^2 Y^2$, adjustable on the beveled portions to reduce the width of the groove, and the removable plates $B^3 B^3$, placed in the ends of the groove to reduce the size of the same, and provided with the end flanges, $C^3$, for retaining it in position, as set forth.

6. The combination of the beams A A, having the cultivator-standards embracing their rear ends, the intermediate front beams projecting in between the beams A A and carrying the embracing-standards and securing-rod D, the crank sprocket-wheel shaft journaled in the plates Z, having the slots $A^2$, the pins N, passing through the securing and bracing rods D at the rear ends of the beams A A, and through the slots $A^2$, the removable hopper, the seeding operating slide or pitman connected with a collar on the crank of the sprocket-wheel shaft, and the removable bottom block arranged to rest on the beams A A, and comprising the parts $V^2 W^2 X^2$, adjustable plates $Y^2$, and the plates $B^3$, having flanges $C^3$, as set forth.

In testimony that I claim the foregoing as my own I have hereto affixed my signature in presence of two witnesses.

EDWARD D. CARTER.

Witnesses:
H. F. DUNSON,
C. S. TATUM.